Feb. 20, 1951 A. MACKMANN ET AL 2,542,546
HOB FOR FORMING DOUBLE ENVELOPING WORM GEARS
Filed Sept. 10, 1945
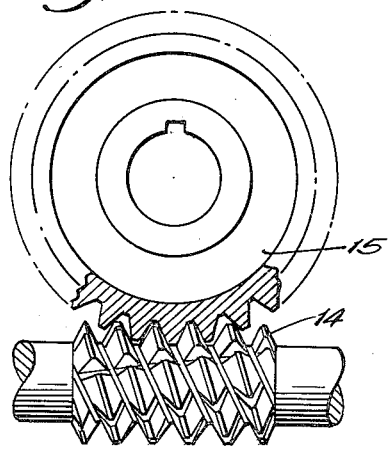
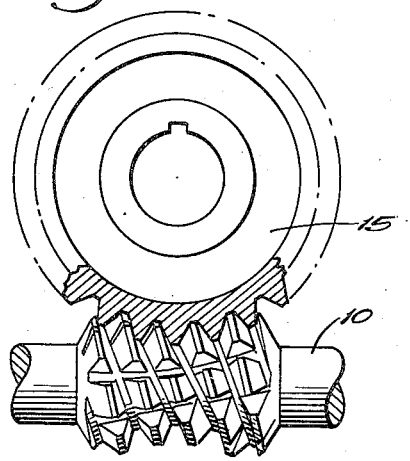
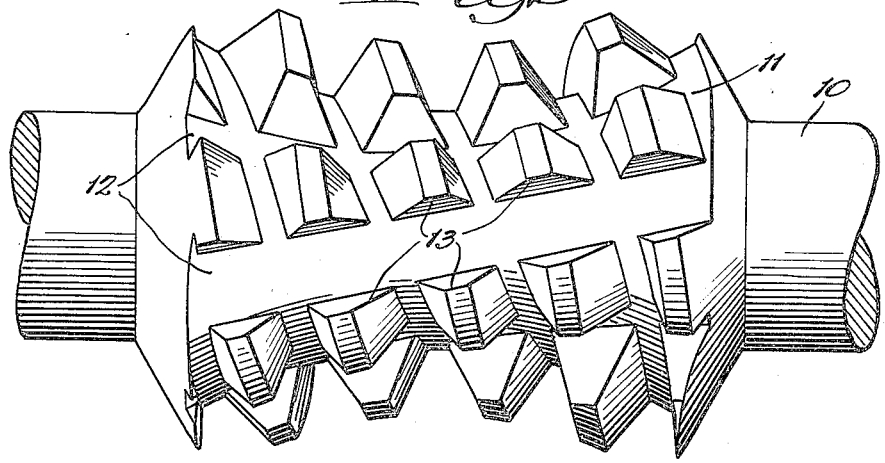
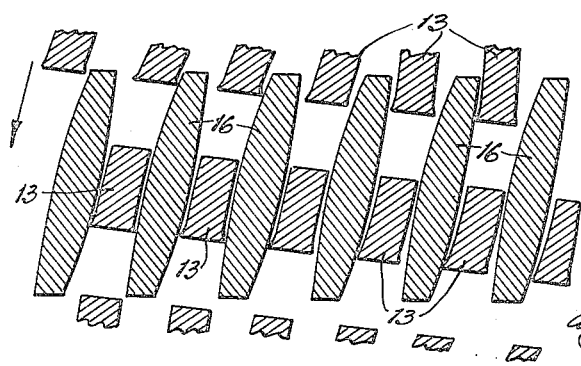
Inventors:
Arthur Mackmann
and Bertel S. Nelson,
By Dawson Booth and Spangenberg
Attorneys.

Patented Feb. 20, 1951

2,542,546

UNITED STATES PATENT OFFICE 2,542,546

HOB FOR FORMING DOUBLE ENVELOPING WORM GEARS

Arthur Mackmann and Bertel S. Nelson, Chicago, Ill., assignors to Foote Bros. Gear and Machine Corporation, Chicago, Ill., a corporation of Delaware Application September 10, 1945, Serial No. 615,298

3 Claims. (Cl. 29—103)

This invention relates to method of and hob for forming double enveloping worm gears and has for one of its principal objects the formation of gears of this type accurately and inexpensively by a simple hobbing operation.

In forming double enveloping worm gears, it has heretofore been considered impossible to cut the gear teeth by a straight infeed hobbing process due to the existence of interferences which cause the hob to cut away portions of the gear teeth which are essential to proper contact. Furthermore, hobs of the hourglass or double enveloping type have been extremely difficult and expensive to manufacture due to the difficulty of properly grinding the flanks of the hob teeth.

In our co-pending application, Serial No. 571,905, filed Jan. 8, 1945, now Patent No. 2,432,246, issued Dec. 9, 1947, there is disclosed and claimed a system of double enveloping gearing in which the worm is hardened and ground and the gear is so constructed that it can be formed by an infeed hob process. The present invention relates to the formation of gears of this type and has for its objects the provision of a method of and a hob for forming double enveloping worm gears in which the gears are formed by a two stage hobbing operation and in which the finishing hob can be made accurately and inexpensively by a grinding operation and will finish the gear teeth accurately by an infeed hobbing operation.

The above and other objects and advantages of the invention will be more readily apparent from the following description when read in connection with the accompanying drawing, in which—

Figure 1 is a side view with parts in section illustrating a rough hobbing operation;

Figure 2 is a similar view illustrating a finish hobbing operation;

Figure 3 is an enlarged view of the finishing hob; and

Figure 4 is a developed sectional view along the pitch line of a gear illustrating the action of the hob teeth on the gear teeth.

Referring first to the hob as more particularly illustrated in Figure 3, it will be seen that the hob is substantially an exact replica of a worm to run with the gear except that the teeth are made slightly deeper to produce the necessary running clearances at the throat and root of the worm and are preferably slightly wider than the worm teeth to provide the necessary running clearance at the flanks of the gear teeth. As shown, the hob is formed on or secured to a driving shaft 10 and has a body 11 of substantially hourglass shape with its minimum diameter at its center plane and with the diameter increasing toward the ends. Upon the hob body 11 there are formed one or more threads which are gashed, as indicated at 12, to produce a series of separate cutting teeth 13.

In forming the threads on the hob prior to gashing, substantially the same process may be followed as that described in our co-pending application Serial No. 571,905. According to this method, the hob teeth may be cut by a tool which pivots about a center corresponding to the center of the worm gear. The teeth are preferably straight sided in axial section, as shown. Following the cutting operation, the gashes 12 are preferably formed by a similar cutting operation by moving a cutting tool axially of the hob while turning the hob. Since the helical pitch of the teeth changes at different points in the length of the hob, it is apparent that the gashes cannot be exactly perpendicular to the hob teeth at all points, if gashes having a constant pitch are used. Preferably, the gashes are made normal to the average helix angle of the teeth so that they will be substantially perpendicular to the teeth in all positions. Preferably also, the number of gashes cut is different than the number of teeth on the hob so that the teeth on different threads will lie at different axial displacements from the center plane. For example, if a six threaded hob were gashed with six gashes, the teeth in each thread would lie in similar positions. By gashing such a hob with five or seven gashes, the teeth in different threads lie in different axial positions to produce the effect of a hob having a greater number of teeth so that a more accurate gear will be formed.

Following the gashing, the hob is preferably hardened and is ground in a manner similar to grinding of the worm as disclosed in our co-pending application referred to above. According to this operation, a grinding wheel is employed which rotates about its axis and which is so set that its plane is substantially parallel to the sides of the hob teeth at one position in the hob length. Selection of this position may be determined according to the contact desired between the completed gear and the worm as more fully explained in our co-pending application. With this type of grinding operation, the tooth contour varies slightly throughout the length of the hob. In addition to the normal grinding operation, as employed in connection with worms, the wheel is fed slightly out of step with the hob from the forward to the rearward edges of the hob teeth so that the teeth will be relieved slightly behind their forward edges. The outer surfaces of the teeth are similarly ground in a slight spiral to provide relief at the outer ends of the teeth so that the teeth will cut the material of the worm blank properly.

In designing the hob and locating the gashes therein, the construction is such that the cutting edges of the end teeth on the hob correspond substantially in position to the ends of the active thread surfaces of the worm which is to be run with the gear. The end teeth are so designed that their cutting surfaces will lie at substantially the same axial distance from the center plane of the hob so that both flanks of the gear teeth will be cut in the same manner. Preferably, when making the hob, the tooth at the entering end is made slightly farther from the center plane than the end tooth at the leaving end of the hob so that after the hob has been sharpened, the two end teeth cutting edges will lie at the same axial distance. In this way the life of the hob can be extended without seriously interfering with its accuracy. Preferably, displacement of the end teeth is such that they lie at the same axial distance from the center plane when the hob has served approximately one-half of its useful life.

In order that the hob may be infed properly into the gear blank, its length is made less than the diameter of the base circle of the gear to correspond to the worm length as explained in our co-pending application Serial No. 571,905. With the hob constructed as described above, it can be infed into the gear blank and will produce a gear which will run accurately with a worm which is a substantial replica of the hob.

In order to prolong the life of the hobs which are relatively expensive, as compared with conventional cylindrical hobs, the gear blank is preferably rough cut with a cylindrical hob as indicated in Figure 1. As shown in this figure, a standard cylindrical hob 14 may be infed into the gear blank indicated at 15 to rough form the gear teeth. The cylindrical hob has a tooth depth substantially the same as the final gear tooth depth and has a root radius substantially equal to the throat radius of the gear. This hob is infed into the gear blank to its full tooth depth and rough forms the gear teeth so that only a finishing of the tooth flanks is required to complete the gear.

For the finishing operation, the double enveloping hob described above is infed into the blank, as indicated in Figure 2, to the full tooth depth. During this infeeding operation, the flanks of the gear teeth are cut to final shape to complete the gear.

Action of the double enveloping hob on the gear teeth during the cutting operation is indicated by the diagram of Figure 4 in which the gear teeth are shown at 16. As shown in this figure, the end teeth cut substantially across the full length of the gear teeth while the center teeth cut only adjacent the centers of the gear teeth. The end teeth of the hob therefore tend to wear more rapidly than the center teeth so that the rough cutting operation with a cylindrical hob which can be shifted axially to utilize all of its teeth to the same extent substantially extends the life of the double enveloping hob and reduces the cost of the overall hobbing operation.

We have found that by the present invention, double enveloping worm gears can be formed which will mesh accurately with worms substantially like the hob. In fact, sufficient accuracy can be produced by the present invention to permit interchangeability of the worms and gears and substantially to eliminate the necessity for running in the gears as has heretofore been the practice with gears of this type.

While one embodiment of the invention has been shown and described in detail, it will be understood that this is illustrative only and is not intended as a definition of the scope of the invention, reference being had for this purpose to the appended claims.

What is claimed is:

1. A hob for forming double enveloping worm gears comprising a body of minimum diameter in its center plane curving outwardly to portions of maximum diameter at its ends, and a thread on the body of varying cross section from the center plane toward the ends, the thread being gashed to form a series of cutting teeth.

2. A hob for forming double enveloping worm gears comprising a body of minimum diameter in its center plane curving outwardly to portions of maximum diameter at its ends and a plurality of threads on the body, the threads being gashed with a number of gashes different than the number of threads such that the teeth on different threads lie at different axial distances from the center plane.

3. A hob for forming double enveloping worm gears comprising a body of minimum diameter in its center plane curving outwardly to portions of maximum diameter at its ends, and a plurality of threads on the body, the threads being gashed with a number of gashes different than the number of threads such that the teeth on different threads lie at different axial distances from the center plane, and the threads terminating at the ends of the hob to provide end teeth spaced a distance less than the diameter of the base circle of the gear to be formed and the cutting surfaces of which substantially correspond to the ends of the active thread surfaces of a worm to run with the gear.

ARTHUR MACKMANN.
BERTEL S. NELSON.

REFERENCES CITED

The following references are of record in the file of this patent:

UNITED STATES PATENTS

| Number | Name | Date |
|---|---|---|
| 1,553,666 | Bostock et al. | Sept. 15, 1925 |
| 1,903,043 | Head | Mar. 28, 1933 |
| 2,026,215 | Cone | Dec. 31, 1935 |
| 2,164,643 | Drader | July 4, 1939 |
| 2,326,932 | Drader | Aug. 17, 1943 |
| 2,338,366 | Trbojevich | Jan. 4, 1944 |